(12) United States Patent
Nishisaka et al.

(10) Patent No.: US 9,520,232 B2
(45) Date of Patent: Dec. 13, 2016

(54) MULTILAYER CERAMIC ELECTRONIC COMPONENT

(71) Applicant: Murata Manufacturing Co., Ltd., Nagaokakyo-shi, Kyoto-fu (JP)

(72) Inventors: Yasuhiro Nishisaka, Nagaokakyo (JP); Kotaro Shimizu, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 51 days.

(21) Appl. No.: 14/674,373

(22) Filed: Mar. 31, 2015

(65) Prior Publication Data
US 2015/0279562 A1 Oct. 1, 2015

(30) Foreign Application Priority Data
Mar. 31, 2014 (JP) ................. 2014-072931

(51) Int. Cl.
| | |
|---|---|
| H01G 4/248 | (2006.01) |
| H01G 4/008 | (2006.01) |
| H01G 4/012 | (2006.01) |
| H01G 4/12 | (2006.01) |
| H01G 4/30 | (2006.01) |
| H01G 4/232 | (2006.01) |

(52) U.S. Cl.
CPC .............. *H01G 4/008* (2013.01); *H01G 4/012* (2013.01); *H01G 4/1227* (2013.01); *H01G 4/1245* (2013.01); *H01G 4/2325* (2013.01); *H01G 4/248* (2013.01); *H01G 4/30* (2013.01); *H01G 4/12* (2013.01)

(58) Field of Classification Search
CPC ....... H01G 4/228; H01G 4/232; H01G 4/2325
See application file for complete search history.

(56) References Cited

U.S. PATENT DOCUMENTS

| | | | |
|---|---|---|---|
| 5,251,094 A | 10/1993 | Amano et al. | |
| 8,259,433 B2 | 9/2012 | Nishisaka et al. | |
| 2008/0080122 A1* | 4/2008 | Togashi | H01G 4/232 361/303 |
| 2008/0239617 A1* | 10/2008 | Motoki | H01G 4/232 361/301.4 |

(Continued)

FOREIGN PATENT DOCUMENTS

| | | |
|---|---|---|
| JP | H04-352309 A | 12/1992 |
| JP | H05-29176 A | 2/1993 |

(Continued)

*Primary Examiner* — Dion R Ferguson
(74) *Attorney, Agent, or Firm* — Arent Fox LLP

(57) ABSTRACT

A multilayer ceramic electronic component having outer electrodes that each include an end-face outer electrode disposed on an end face of a ceramic multilayer body and side-face outer electrodes formed by a sputtering method on side faces of the ceramic multilayer body and electrically connected to the end-face outer electrode. A sputtering electrode layer of each of the side-face outer electrodes in contact with the ceramic multilayer body is composed of a material containing 3% by mass or more of a metal having a standard oxidation-reduction potential of −2.36 to −0.74 V, and an outermost sputtering electrode layer which is an outermost layer of each of the side-face outer electrodes is composed of at least one of Sn and Bi or an alloy containing 5% by mass or more of at least one of Sn and Bi.

6 Claims, 2 Drawing Sheets

(56) References Cited

U.S. PATENT DOCUMENTS

2010/0123994 A1    5/2010  Nishisaka et al.
2013/0208401 A1*   8/2013  Shirakawa ............. H01G 13/06
                                                         361/305
2014/0063684 A1*   3/2014  Lee ........................ H01G 4/30
                                                         361/301.4

FOREIGN PATENT DOCUMENTS

JP    2010-141300 A    6/2010
JP    2012-190874 A   10/2012
JP    2012-231047 A   11/2012
JP         5287658 B2   9/2013

* cited by examiner

MULTILAYER CERAMIC ELECTRONIC COMPONENT

BACKGROUND OF THE INVENTION

1. Field of the Invention

The present invention relates to a multilayer ceramic electronic component, and more particularly, relates to a multilayer ceramic electronic component which includes a ceramic multilayer body formed by stacking ceramic layers, inner electrodes disposed therein, and outer electrodes disposed on surfaces of the ceramic multilayer body so as to be electrically connected to the inner electrodes.

2. Description of the Related Art

As a method for manufacturing a multilayer ceramic capacitor, which is a typical multilayer ceramic electronic component, Japanese Unexamined Patent Application Publication No. 2012-190874 (Patent Document 1) describes a method for manufacturing a multilayer ceramic capacitor as described below.

In the method for manufacturing a multilayer ceramic capacitor according to Patent Document 1, first, first and second green sheets each provided with an unfired inner electrode layer are prepared, the first and second green sheets are alternately stacked such that electrostatic capacity-forming portions of the unfired inner electrode layers are superimposed on one another, and thereby, an unfired ceramic multilayer body is formed.

Then, the unfired ceramic multilayer body is cut into a one-chip region, and the extending portion of each unfired inner electrode layer is exposed to either one of end faces of the unfired ceramic multilayer body. By applying a conductive paste to the end faces of the unfired ceramic multilayer body to which the extending portions of the unfired inner electrode layers are exposed, unfired underlying metal layers are formed.

Then, by firing the unfired ceramic multilayer body, the green sheets, the unfired inner electrode layers, and the unfired underlying metal layers are co-fired, and plating is performed on the surfaces of the fired underlying metal layers.

Thereby, for example, as shown in FIG. 2, a multilayer ceramic electronic component is obtained. The multilayer ceramic electronic component includes a ceramic multilayer body 110 in which a plurality of inner electrodes 102a and a plurality of inner electrodes 102b are alternately disposed with a ceramic layer 101 interposed therebetween, and outer electrodes 104a and 104b are disposed on end faces 103a and 103b of the ceramic multilayer body 110 so as to be electrically connected to the inner electrodes 102a and 102b extending to the different end faces 103a and 103b.

However, in the manufacturing method of Patent Document 1, outer electrodes are formed by applying the conductive paste to the end faces of the unfired ceramic multilayer body, followed by baking (co-firing with the unfired ceramic multilayer body). Therefore, the thickness of the outer electrodes is large (usually, 10 μm or more), resulting in an increase in the size of the multilayer ceramic capacitor, i.e., finished product, which is a problem.

In particular, in the case of a multilayer ceramic electronic component to be built in a multilayer board or the like in which it is desired to decrease the thickness (height) of the finished product as much as possible, the thickness of the outer electrodes has a non-negligible effect on the thickness (height) of the finished product.

It is conceivable that, by decreasing the specific gravity of the conductive paste, the coating thickness of the conductive paste is decreased (a thin coating is applied). In such a case, electrode continuity is decreased at the ridge portions (corners) of the ceramic multilayer body, resulting in insufficient reliability, which is a problem.

Furthermore, Japanese Patent No. 5287658 (Patent Document 2) discloses a method for manufacturing a ceramic electronic component (multilayer ceramic capacitor according to an embodiment).

In the method of Patent Document 2, first, a predetermined number of ceramic green sheets for outer layers without an inner electrode pattern formed thereon are stacked. Then, a predetermined number of ceramic green sheets with a first inner electrode pattern printed thereon and a predetermined number of ceramic green sheets with a second inner electrode pattern printed thereon are alternately stacked on the stacked ceramic green sheets. Then, a predetermined number of ceramic green sheets for outer layers without an inner electrode pattern formed thereon are further stacked on the stacked ceramic green sheets to produce a mother multilayer body.

Next, outer terminal electrode patterns, which will become first and second outer terminal electrodes, are formed on the upper and lower surfaces of the resulting mother multilayer body by screen printing or the like.

Then, the mother multilayer body is cut at predetermined positions and divided into individual ceramic multilayer bodies (unfired ceramic bodies). Next, each ceramic multilayer body is subjected to barrel polishing, and then, a conductive paste is applied to end faces, followed by baking to form outer terminal electrodes. Thus, a ceramic electronic component is obtained.

In the method for manufacturing a ceramic electronic component (multilayer ceramic capacitor according to an embodiment) described in Patent Document 2, outer terminal electrode patterns, which will become portions of first and second outer terminal electrodes that extend from the end faces to partially surround the upper and lower surfaces (side faces), are formed by a screen printing method or the like. Therefore, it is possible to decrease the thickness of the outer terminal electrodes disposed on the upper and lower surfaces (side faces) of the ceramic multilayer body compared with the case of Patent Document 1 described above, and the thickness (height) of the ceramic electronic component can be decreased.

However, in the method of Patent Document 2, although the thickness of the outer terminal electrodes disposed on the upper and lower surfaces can be decreased, the thickness is decreased to only about 5 μm. If the thickness is further decreased, scraping of the electrodes may occur at the time of the barrel polishing treatment for imparting roundness (R) to the ridge portions after singulation of individual ceramic multilayer bodies has been performed by dividing the mother multilayer body, which may result in plating defects or a decrease in conduction reliability, which is a problem.

SUMMARY OF THE INVENTION

It is an object of the present invention to provide a multilayer ceramic electronic component in which the thickness of outer electrodes can be decreased, which is thus suitable for decreasing the size and thickness of the finished product, in which outer electrodes have excellent adhesion to the ceramic body (ceramic multilayer body) and excellent plating resistance, and which has high reliability.

According to preferred embodiments of the present invention, a multilayer ceramic electronic component includes a ceramic multilayer body formed by stacking ceramic layers, inner electrodes disposed therein, and outer electrodes disposed on surfaces of the ceramic multilayer body so as to be electrically connected to the inner electrodes. The multilayer ceramic electronic component is characterized in that (a) the outer electrodes each include an end-face outer electrode disposed on an end face of the ceramic multilayer body to which some of the inner electrodes extend, and side-face outer electrodes formed by a sputtering method on side faces of the ceramic multilayer body in contact with the end face thereof and electrically connected to the end-face outer electrode; and (b) a sputtering electrode layer which constitutes each of the side-face outer electrodes and which is in contact with the ceramic multilayer body includes a material containing 3% by mass or more of a metal having a standard oxidation-reduction potential of −2.36 to −0.74 V, and an outermost sputtering electrode layer which is an outermost layer constituting each of the side-face outer electrodes includes at least one of Sn and Bi or an alloy containing 5% by mass or more of at least one of Sn and Bi.

Furthermore, according to preferred embodiments of the present invention, the metal contained in the sputtering electrode layer of the side-face outer electrode in contact with the ceramic multilayer body is preferably at least one selected from the group consisting of Mg, Al, Ti, W, and Cr.

In the case where the sputtering electrode layer of the side-face outer electrode in contact with the ceramic multilayer body contains the metal described above, it is possible to secure adhesion of the outer electrode to the ceramic multilayer body, thereby making the preferred embodiments of the present invention more effective. That is, by using, as the metal contained in the layer in contact with the ceramic multilayer body, a metal (at least one of Mg, Al, Ti, W, and Cr) having a standard oxidation-reduction potential of −2.36 to −0.74 V, i.e., having a base standard oxidation-reduction potential, it is possible to form outer electrodes which have excellent adhesion to a multilayer ceramic device, which include thin end-face outer electrodes, and which have high reliability overall.

According to preferred embodiments of the present invention, preferably, a metal film formed by plating is further provided on the surface of each of the outer electrodes.

For example, in the case where the multilayer ceramic electronic component is embedded and mounted in a ceramic substrate, by providing a Cu plating film on the surface of the outer electrode, resistance to laser machining is improved to enhance via connection reliability when a via-hole is formed by laser machining to provide electrical connection with the embedded multilayer ceramic electronic component. In the case where the multilayer ceramic electronic component is soldering-mounted, by providing a Ni plating film and a SN plating film on the surface of the outer electrode, it is possible to improve solderability.

In the multilayer ceramic electronic component according to preferred embodiments of the present invention, the layer of the side-face outer electrode in contact with the ceramic multilayer body is composed of a material containing 3% by mass or more of a metal having a standard oxidation-reduction potential of −2.36 to −0.74 V, and the outermost layer of the side-face outer electrode (outermost sputtering electrode layer) is composed of at least one of Sn and Bi or an alloy containing at least one of Sn and Bi. Consequently, it is possible to provide a multilayer ceramic electronic component in which the thickness of outer electrodes is small, which is suitable for decreasing the size and thickness, and which has high reliability.

That is, in the multilayer ceramic electronic component according to preferred embodiments of the present invention, by forming the layer (sputtering electrode layer) of the side-face outer electrode in contact with the ceramic multilayer body using a material containing 3% by mass or more of a metal having a standard oxidation-reduction potential of −2.36 to −0.74 V (metal having a base standard oxidation-reduction potential), adhesion of the outer electrode to the ceramic multilayer body (ceramic multilayer body) is ensured. Furthermore, by forming the outermost layer (outermost sputtering electrode layer) of the side-face outer electrode using at least one of Sn and Bi or an alloy containing 5% by mass or more of at least one of Sn and Bi, it is possible to improve resistance to hydrogen that is generated in a plating process in which plating is performed on the outer electrode, and it is possible to form an outer electrode having excellent plating resistance and high reliability.

The outermost layer (outermost sputtering electrode layer) of the side-face outer electrode is required to have conductivity in view of the case where plating treatment is performed thereon to form a plating film. Furthermore, in the case where a plating film is formed, if hydrogen generated in the plating process is incorporated into the outermost layer (outermost sputtering electrode layer) and diffused into an inner electrode, the inner electrode (e.g., Ni) is swollen, resulting in a degradation in reliability. Therefore, the outermost layer (outermost sputtering electrode layer) needs to be composed of a metal species which is unlikely to absorb (unlikely to dissolve) hydrogen. Accordingly, in preferred embodiments of the present invention, at least one of Sn and Bi or an alloy containing at least one of Sn and Bi is used.

Since the outermost layer (outermost sputtering electrode layer) composed of at least one of Sn and Bi or an alloy containing at least one of Sn and Bi is unlikely to absorb (unlikely to dissolve) hydrogen, it is possible to improve resistance to hydrogen that is generated in the process in which plating is performed on the outer electrode.

The end-face outer electrode can be formed by a common method, such as a method in which a conductive paste containing Ni powder as a conductive component is applied by immersion and baking is performed. The end-face outer electrode formed in such a manner has excellent conduction reliability with the inner electrodes.

Consequently, according to preferred embodiments of the present invention described above, it is possible to provide a highly reliable multilayer ceramic electronic component which includes outer electrodes having good characteristics, such as excellent adhesion with the ceramic multilayer body, plating resistance, and conduction reliability.

Furthermore, since the multilayer ceramic electronic component according to preferred embodiments of the present invention includes outer electrodes having the structure described above, it is possible to ensure the quality equivalent to that of the existing multilayer ceramic electronic component having thick outer electrodes while decreasing the thickness of the outer electrodes. The factors for being able to achieve such an effect are that each outer electrode is configured to include an end-face outer electrode and side-face outer electrodes electrically connected to the end-face outer electrode; the thickness of the side-face outer electrodes is decreased by employing a sputtering technique to form the side-face outer electrodes; the end-face outer electrode is configured to have two or more layers; the layer in contact with the ceramic multilayer body is uniformly formed as a thin film of a metal having a base standard oxidation-reduction potential employing a sputtering technique, which cannot be formed by an electrolytic plating technique; and the outermost layer is formed using at least one of Sn and Bi or an alloy containing at least one of Sn and Bi that has excellent resistance to hydrogen that is generated in the plating process.

Furthermore, in Patent Document 2 described above, electrodes are formed by screen printing in a state of mother multilayer body (block), and therefore, in the process of chamfering the corners by barrel polishing after being singulated, abrasion wear (scraping), peeling-off, or the like occurs in the outer electrodes. In contrast, in preferred embodiments of the present invention, outer electrodes can be formed after singulation and chamfering the corners by barrel polishing. Therefore, abrasion wear, peeling-off, or the like of the outer electrodes is not caused by barrel polishing, and it is possible to form highly reliable outer electrodes even if the thickness is small.

Furthermore, according to preferred embodiments of the present invention, since the side-face outer electrode is a sputtering film, not only a decrease in the thickness of the side-face outer electrode but also planarization can be achieved. Consequently, it is possible to decrease variations in height of a multilayer ceramic electronic component, i.e., finished product, and to improve postural stability at the time of mounting.

Consequently, for example, in the case where the multilayer ceramic electronic component is embedded and mounted in a ceramic substrate, via connection reliability can be improved when a via-hole is formed by laser machining to provide electrical connection with the embedded multilayer ceramic electronic component.

Furthermore, in a multilayer ceramic electronic component in which height is strictly limited, such as a thin multilayer ceramic capacitor for embed mounting, by decreasing the thickness of outer electrodes, the unit thickness (the thickness of the multilayer ceramic electronic component excluding the thickness of side-face outer electrodes) can be designed to be larger than that of the known case without increasing the overall thickness of the finished product. Therefore, it is possible to improve mounting strength.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention will be described below to explain characteristics of the present invention more specifically.

Figure 1:
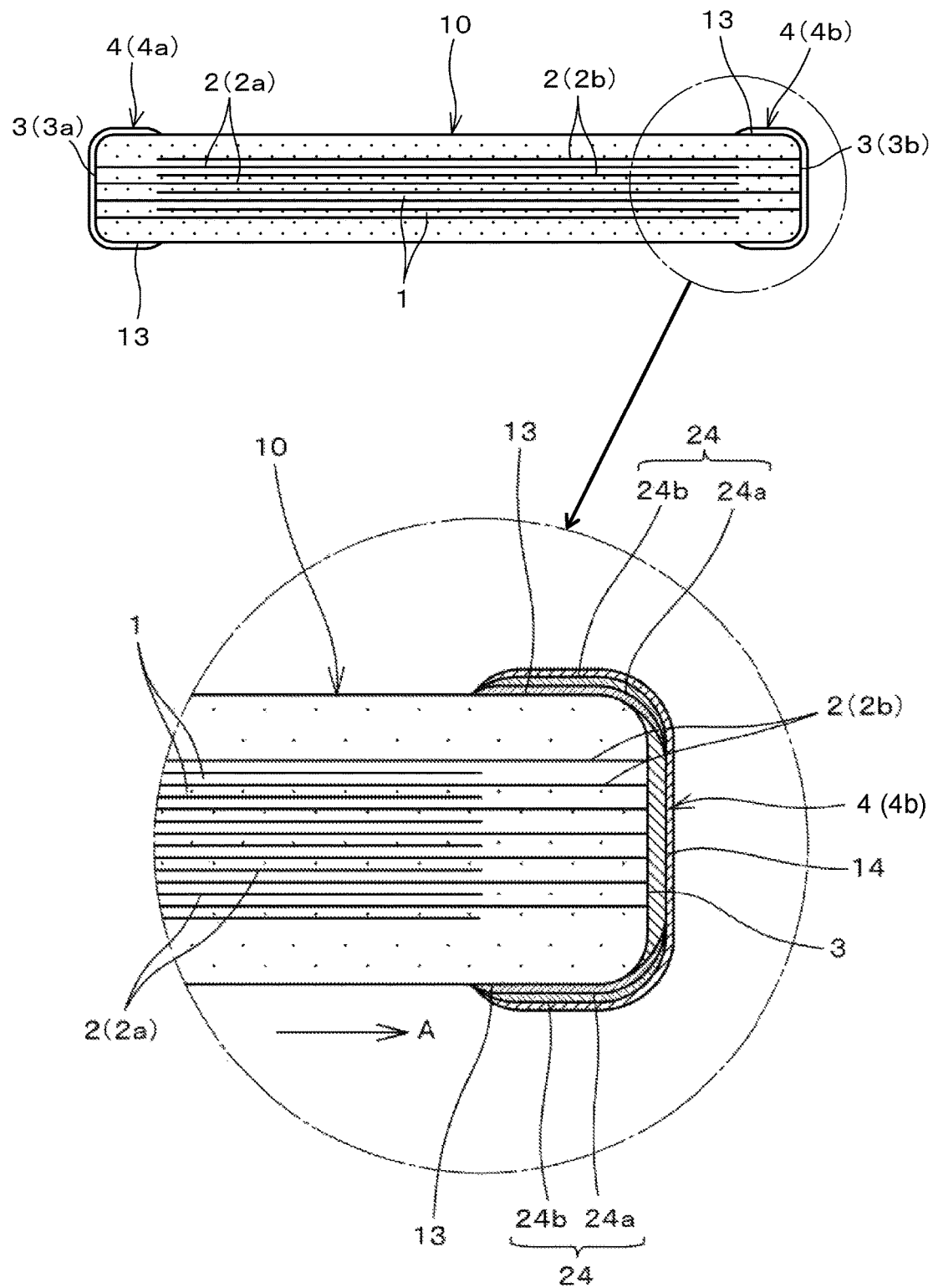
FIG. 1 is an elevational cross-sectional view showing a structure of a multilayer ceramic electronic component (thin multilayer ceramic capacitor) according to an embodiment of the present invention.
Figure 2:
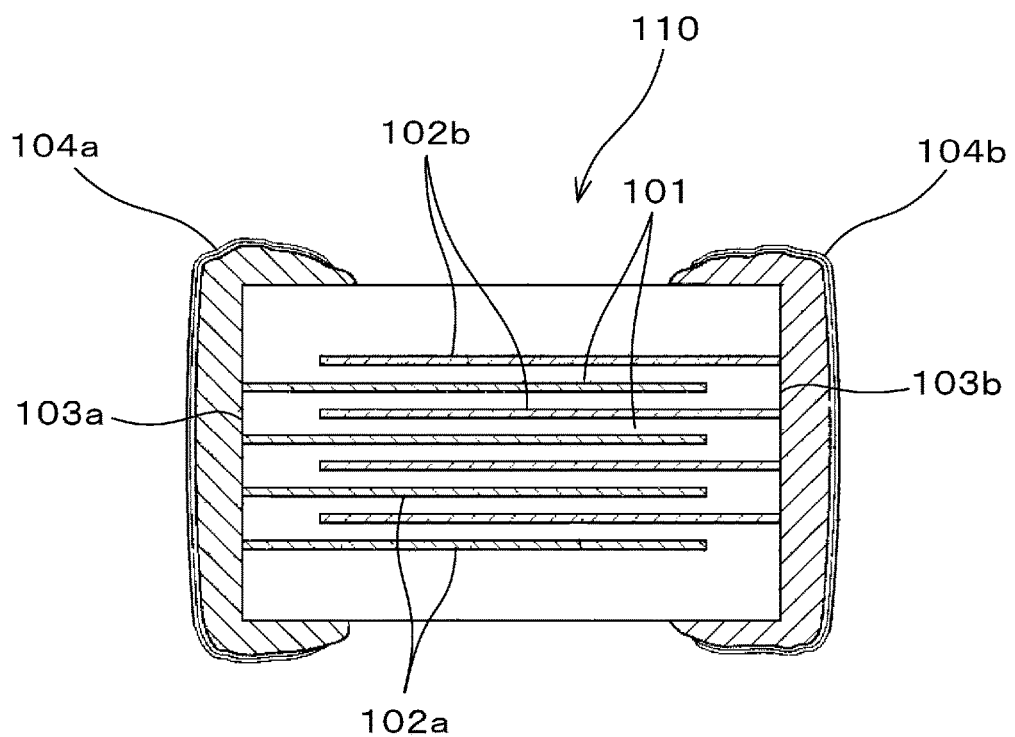
FIG. 2 is an elevational cross-sectional view of a known multilayer ceramic electronic component.

FIG. 1 is an elevational cross-sectional view showing a structure of a multilayer ceramic electronic component (thin multilayer ceramic capacitor) according to an embodiment of the present invention.

As shown in FIG. 1, the multilayer ceramic capacitor includes a ceramic multilayer body (multilayer ceramic capacitor element) 10 formed by stacking a plurality of inner electrodes 2 (2a, 2b) with a ceramic layer 1 which is a dielectric layer interposed therebetween, and outer electrodes 4 (4a, 4b) disposed on end faces 3 (3a, 3b) of the ceramic multilayer body so as to be electrically connected to the inner electrodes 2 (2a, 2b). The multilayer ceramic capacitor is a thin multilayer ceramic capacitor, which is embedded and mounted in a ceramic substrate for use.

The outer electrodes 4 (4a, 4b) are disposed so as to extend from two end faces 3 (3a, 3b) of the rectangular parallelepiped ceramic multilayer body 10 to partially surround four side faces 13.

The outer electrodes 4 provided on the multilayer ceramic capacitor according to this embodiment each includes an end-face outer electrode 14 disposed on the end face 3 of the ceramic multilayer body 10 to which some of the inner electrodes 2 extend, and side-face outer electrodes 24 disposed on side faces 13 in contact with the end face 3 of the ceramic multilayer body 10 and electrically connected to the end-face outer electrode.

The end-face outer electrode 14 includes one or more electrode layers (Ni electrode layers), and in this embodiment, the end-face outer electrode 14 is a Ni electrode formed by baking a Ni paste.

The side-face outer electrodes 24 each includes a sputtering electrode layer 24a which is formed by a sputtering technique and which is in contact with the ceramic multilayer body 10, and an outermost sputtering electrode layer 24b which is an outermost layer constituting the side-face outer electrode 24.

In the multilayer ceramic electronic component according to this embodiment, the sputtering electrode layer 24a in contact with the ceramic multilayer body 10 is composed of a material containing 3% by mass or more of a metal having a standard oxidation-reduction potential of $-2.36$ to $-0.74$ V (e.g., at least one metal selected from the group consisting of Mg, Al, Ti, W, and Cr).

The outermost sputtering electrode layer 24b which is an outermost layer is composed of at least one of Sn and Bi or an alloy containing at least one of Sn and Bi that has excellent resistance to hydrogen that is generated in the plating process.

<Fabrication of Multilayer Ceramic Capacitor>

In order to fabricate the multilayer ceramic capacitor, first, a plurality of ceramic green sheets with an electrode pattern to be formed into an inner electrode, and ceramic green sheets for outer layers to be formed into outer layer portions on the upper and lower surface sides, without an electrode pattern to be formed into an inner electrode, were prepared. By stacking the ceramic green sheets in a predetermined order, a mother multilayer body was formed.

Then, by cutting and dividing the mother multilayer body into individual bodied, unfired ceramic multilayer bodies (multilayer ceramic capacitor elements) were obtained.

As the ceramic material constituting the ceramic multilayer bodies (ceramic material constituting the ceramic green sheets), for example, a dielectric ceramic containing, as a main component, $BaTiO_3$, $CaTiO_3$, $SrTiO_3$, $CaZrO_3$, or the like can be used. Furthermore, it may also be possible to use a material obtained by adding a secondary component, such as a Mn compound, a Mg compound, a Si compound, a Co compound, a Ni compound, or a rare-earth element compound, to the main component described above.

Furthermore, conductive patterns to be formed into inner electrodes for capacity formation are formed by printing or applying a conductive paste containing Ni as a main conductive component onto the surfaces of ceramic green sheets, for example, by a screen printing method. It may also be possible to use, as a conductive component, a conductive paste using another metal material, and the application onto the ceramic green sheets may be performed by a method other than the screen printing method.

A method for forming outer electrodes including end-face outer electrodes and side-face outer electrodes will be described below.

(1) Formation of End-Face Outer Electrodes

A Ni paste for co-firing (conductive paste containing Ni powder as a conductive component, which can be fired simultaneously with the ceramic multilayer body) was applied to end faces of the ceramic multilayer body before being subjected to firing (unfired ceramic multilayer body).

As the Ni paste for co-firing, a paste containing Ni metal powder and the ceramic powder (ceramic powder having the same composition as the ceramic material constituting the ceramic green sheets (common material)) was used.

In this embodiment, the Ni paste for co-firing used had a ratio of the Ni metal powder to the common material (Ni/common material) of 60/40 vol %. Furthermore, the Ni metal powder used had a particle size of 0.5 μm.

Then, using the Ni paste for co-firing, a paste layer was formed by a squeegee at a thickness of 30 μm on a stage, and end faces of the unfired ceramic multilayer body were subjected to immersion coating in the paste layer. Thereby, the conductive paste was applied to the end faces of the unfired ceramic multilayer body.

In this process, since the thickness of the layer of the Ni paste for co-firing formed on the stage is small at 30 μm, the Ni paste for co-firing is applied to substantially only to the end faces of the unfired ceramic multilayer body. However, a small amount of paste extends over the ridge portions and partially surrounds the side faces of the unfired ceramic multilayer body. However, it does not extend to such a degree that the thickness of the multilayer ceramic capacitor, i.e., finished product, is affected.

Subsequently, by co-firing the unfired ceramic multilayer body and the Ni paste for co-firing, end-face outer electrodes (baked electrodes) 14 (refer to FIG. 1) were formed. The end-face outer electrode is an electrode (Ni baked electrode) having a single-layer structure with a thickness of 10 μm at the center of the end face.

(2) Formation of Side-Face Outer Electrodes

The fired ceramic multilayer body provided with the end-face outer electrodes (Ni baked electrodes) was set in an exclusive masking jig. The masking jig is configured such that only regions in which side-face outer electrodes (which constitute outer electrodes together with the end-face outer electrodes) are to be formed can be exposed.

The ceramic multilayer body was placed in a sputtering system with only regions in which side-face outer electrodes were to be formed being exposed, and Ti sputtering films (sputtering electrode layers in contact with the ceramic multilayer body 10) 24a were formed by a sputtering technique in predetermined regions of the side faces of the ceramic multilayer body (intended regions on the upper and lower surfaces of the ceramic multilayer body), and Sn sputtering films (outermost sputtering electrode layers) 24b were formed on the Ti sputtering films 24a. Side-face outer electrodes 24 having a two-layer structure are formed by the Ti sputtering films 24a and the Sn sputtering films 24b.

In this embodiment, as a layer (sputtering electrode layer) of each of the side-face outer electrodes 24 in contact with the ceramic multilayer body 10, a Ti sputtering film with a thickness of 100 nm was formed, and a Sn sputtering film with a thickness of 1,000 nm (1 μm) was formed thereon as the outermost layer (outermost sputtering electrode layer) of each of the side-face outer electrodes 24.

In this case, Ti is a metal having a standard oxidation-reduction potential of −1.63 V, and Sn is a metal having excellent resistance to hydrogen that is generated in the plating process.

The sputtering conditions for Ti and Sn are as shown in Table 1.

TABLE 1

| Item | | Standard |
|---|---|---|
| Input power | Target: Ti | 1.00 ± 0.10 kW |
| | Target: Sn | 2.2 ± 0.10 kW |
| Degree of vacuum | | $5.0 \times 10^{-0}$ to $1.0 \times 10^{-0}$ Pa |
| Ar gas flow rate | | 150 ± 2 SCCM |

<Evaluation of Characteristics>

The multilayer ceramic capacitor provided with the outer electrodes including the end-face outer electrodes and the side-face outer electrodes fabricated as described above was subjected to a tape peeling test for confirming adhesion of the outer electrodes and a high-temperature, high-humidity load test for checking reliability of the multilayer ceramic capacitor.

(1) Tape Peeling Test

In this embodiment, specimens were prepared, in which, as a layer of the side-face outer electrode in contact with the ceramic multilayer body, a layer (sputtering electrode layer) with a thickness of 100 nm composed of one of eight metal species (Na, Mg, Al, Ti, W, Cr, Ni, and Cu), including the Ti layer described above, shown in Table 2 below and two alloy (NiCr alloy and NiTi alloy) species shown in Table 3 below was used, and the specimens were subjected to the tape peeling test. Note that the outermost layer of the side-face outer electrode (outermost sputtering electrode layer) of each of the specimens was a Sn sputtering film with a thickness of 600 nm.

Furthermore, in each of the specimens subjected to the tape peeling test, a Cu plating film was formed by electrolytic plating (wet plating) so as to cover the entire surfaces of the outer electrodes provided with the end-face outer electrodes and the side-face outer electrodes. Note that FIG. 1 shows a multilayer ceramic capacitor in a state in which a plating film is not formed.

(1-1) Test Method of Tape Peeling Test

A principal surface (LW plane in FIG. 1) of each specimen (multilayer ceramic capacitor) was bonded to a glass epoxy substrate using a conductive adhesive.

Subsequently, an adhesive tape (Cellotape (registered trademark) No. 252 manufactured by Sekisui Chemical Co, Ltd.) was attached to a principal surface of the specimen (multilayer ceramic capacitor) on the side opposite the principal surface bonded to the glass epoxy substrate, and by pulling the adhesive tape with a certain tensile force in the length direction of the specimen (e.g., along the direction of the arrow A in FIG. 1), the specimen was peeled from the glass epoxy substrate (180° peeling test).

Then, using an optical microscope at a magnification of 20 times, it was observed whether or not peeling-off occurs in any of sputtering films (layers, such as a Ti sputtering film, in contact with the ceramic multilayer body, and the Sn sputtering film which is an outermost layer).

(1-2) Evaluation

For each specimen (multilayer ceramic capacitor), 20 samples were subjected to the test. The specimen in which peeling-off of the sputtering film occurred even in one sample was evaluated to be poor (x), and the specimen in which no peeling-off occurred in any of the samples was evaluated to be good (○).

The results of the tape peeling test are shown in Tables 2 and 3.

TABLE 2

| Metal species | Standard oxidation-reduction potential (V) | Peeling test evaluation |
|---|---|---|
| Na | −2.71 | Film formation was not possible. |
| Mg | −2.36 | ○ |
| Al | −1.68 | ○ |
| Ti | −1.63 | ○ |
| W | −1.07 | ○ |
| Cr | −0.74 | ○ |
| Ni | −0.26 | X |
| Cu | 0.34 | X |

TABLE 3

| Metal (alloy) species | Peeling test evaluation |
|---|---|
| Ni99Cr1 | X |
| Ni97Cr3 | ○ |
| Ni95Cr5 | ○ |
| Ni90Cr10 | ○ |
| Ni99Ti1 | X |
| Ni97Ti3 | ○ |
| Ni95Ti5 | ○ |
| Ni90Ti10 | ○ |

As shown in Table 2, regarding the specimens in which sputtering films were formed as layers in contact with the ceramic multilayer body using Mg, Al, Ti, W, and Cr, which have a standard oxidation-reduction potential of −2.36 to −0.74 V, among the eight metal species in total (Na, Mg, Al, Ti, W, Cr, Ni, and Cu), peeling-off of the sputtering film was not observed in any of the samples, and the result of the tape peeling test was confirmed to be good.

On the other hand, in the specimen in which Na having a standard oxidation-reduction potential of −2.71 V was used as the metal material constituting the layer in contact with the ceramic multilayer body, it was not possible to form a sputtering film. A metal, such as Na, which has a baser standard oxidation-reduction potential than Mg, is not stable as an oxide, is likely to be ionized, and therefore, is unsuitable for forming a metal film.

Accordingly, in preferred embodiments of the present invention, as the metal constituting a layer in contact with the ceramic multilayer body, it is desirable to use a metal species which is stable as an oxide and which has a nobler standard oxidation-reduction potential than Mg.

Furthermore, in the case of the specimens in which Ni having a standard oxidation-reduction potential of −0.26 V or Cu having a standard oxidation-reduction potential of 0.34 V was used, peeling-off of the sputtering film occurred, and the specimens were confirmed to be undesirable.

The reason for this is believed to be that, since the standard oxidation-reduction potential of each of Ni and Cu is nobler than that in the range of the present invention, the capability of accepting oxygen from the ceramic constituting the ceramic multilayer body and sharing the oxygen element is insufficient, and high adhesion is not obtained.

On the other hand, in a metal having a base oxidation-reduction potential, the oxide thereof is stable, and the metal is likely to be oxidized. Therefore, in the case of the metal species (Mg, Al, Ti, W, or Cr) having a standard oxidation-reduction potential in the range of −2.36 to −0.74 V, it is believed that by accepting oxygen from the ceramic (BaTiO$_3$ in this case) constituting the ceramic multilayer body and sharing the oxygen element, high adhesion is obtained.

Furthermore, in the case of the specimens in which sputtering films of a NiCr alloy or a NiTi alloy were formed as layers in contact with the ceramic multilayer body, as shown in Table 3, no peeling-off of the sputtering film was observed in the specimens in which an alloy containing 3% by mass of more of Cr or Ti (i.e., Ni97Cr3, Ni95Cr5, Ni90Cr10, Ni97Ti3, Ni95Ti5, or Ni90Ti10) was used. Thus, it was confirmed that the results of the tape peeling test were good.

Note that, in the expression of the alloy composition described above, for example, "Ni90Cr10" indicates an alloy containing 90% by mass of Ni and 10% by mass of Cr. The same applied to the other alloys.

On the other hand, in the case where an alloy containing less than 3% by mass of Cr or Ti (Ni99Cr1 or Ni99Ti1) was used, peeling-off of the sputtering film occurred, the specimen was confirmed to be undesirable.

(2) High-Temperature, High-Humidity Load Test (Reliability Test)

Specimens were prepared, in which as an outermost layer of the side-face outer electrode (outermost sputtering electrode layer), a metal layer or an alloy layer composed of one of four metal species (Pd, Ni, Sn, and Bi), including Sn described above, shown in Table 4 below or one of NiSn alloys having different compositions (Ni98Sn2, Ni95Sn5, Ni90Sn10, and Ni80Sn20) shown in Table 5 was used, and the specimens were subjected to a high-temperature, high-humidity load test (reliability test).

Furthermore, in the high-temperature, high-humidity load test, in each of the specimens subjected to the test, a Cu plating film was formed by electrolytic plating (wet plating) so as to cover the entire surfaces of the outer electrodes provided with the end-face outer electrodes and the side-face outer electrodes.

(2-1) Test Method of High-Temperature, High-Humidity Load Test

A high-temperature, high-humidity load test was performed on each specimen under the conditions of a temperature of 125° C., 95% RH, a voltage of ½ WV (3.2 V), a time of 72 hr, and number of samples for each specimen (n)=10.

The samples in which the IR value at the end of the test decreased from the IR value immediately after the start by two orders of magnitude or more was evaluated that reliability was poor (x).

The results thereof are shown in Tables 4 and 5.

TABLE 4

| Metal species | Percent defective in high-temperature, high-humidity test (%) |
|---|---|
| Pd | 100 |
| Ni | 90 |
| Sn | 0 |
| Bi | 0 |

TABLE 5

| Alloy species | Quantitative value of Sn by ULV-SEM/EDX (mol %) | Percent defective in high-temperature, high-humidity test (%) |
|---|---|---|
| Ni98Sn2 (mol % equivalent of Sn = 1.00 mol %) | 0.7 | 40 |
| Ni95Sn5 (mol % equivalent of Sn = 2.54 mol %) | 1.5 | 0 |
| Ni90Sn10 (mol % equivalent of Sn = 5.21 mol %) | 5.2 | 0 |
| Ni80Sn20 (mol % equivalent of Sn = 11.0 mol %) | 11.0 | 0 |

Table 5 also shows the values obtained by converting the percentage of Sn into mol % in the alloys Ni98Sn2, Ni95Sn5, Ni90Sn10, and Ni80Sn20 used for formation of sputtering films.

(2-2) Evaluation

As shown in Table 4, in the specimens in which sputtering films of Pd or Ni, among the four metal species in total (Pd, Ni, Sn, and Bi), were used as outermost layers of the side-face outer electrodes (outermost sputtering electrode layers), occurrence of defects was observed in the high-temperature, high-humidity load test, which was undesirable.

In contrast, in the specimens in which sputtering films of Sn or Bi were used as outermost layers of the side-face outer electrodes (outermost sputtering electrode layers), occurrence of defects was not observed in the high-temperature, high-humidity load test, and the specimens were confirmed to have high reliability.

Furthermore, as shown in Table 5, in the specimen in which sputtering films of Ni98Sn2, among the NiSn alloys (Ni98Sn2, Ni95Sn5, Ni90Sn10, and Ni80Sn20), were used as outermost layers of the side-face outer electrodes, occurrence of defects was observed in the high-temperature, high-humidity load test, which was undesirable.

In contrast, in the specimens in which sputtering films of Ni95Sn5, Ni90Sn10, or Ni80Sn20, among the NiSn alloys, were used as outermost layers of the side-face outer electrodes, occurrence of defects was not observed in the high-temperature, high-humidity load test, and the specimens were confirmed to be desirable.

Table 5 also shows the percentage of Sn (mol %) in the sputtering films formed using the NiSn alloys, determined by ULV-SEM/EDX analysis.

The ULV-SEM/EDX analysis was performed by the method described below.

First, the surface of the electrode film (sputtering film) constituting the outermost layer of the side-face outer electrode was machined at an angle of 5° by FIB, and then measurement (analysis) of Sn was performed by ULV-SEM/EDX under the following conditions:

Accelerating voltage: 4 kV
Tilt angle: 0°
Number of measurement points: 60
Measurement time per point: 20 sec When measurement was performed by ULV-SEM/EDX, in the central region of the electrode film (sputtering film) constituting the outermost layer of the side-face outer electrode, measurement was performed by ULV-SEM/EDX at 60 points at an interval of about 0.1 μm, each at a width of 5 to 6 μm, and the average value of the resulting values was considered as the quantitative value.

According to preferred embodiments of the present invention, since at least one of Sn and Bi or an alloy containing at least one of Sn and Bi is used for forming the electrode film constituting the outermost layer of the side-face outer electrode, for example, it is possible to secure resistance to hydrogen that is generated in the plating process. Furthermore, if a metal having a noble oxidation-reduction potential, such as Ag, Cu, or Ni, is mixed as an alloy, it becomes possible to secure resistance to plating solution (resistance to dissolving in plating solution).

If a metal that is likely to dissolve hydrogen, such as elemental metal Ni, is used as the metal constituting the electrode constituting the outermost layer, hydrogen is diffused in Ni, and hydrogen is diffused into the ceramic multilayer body to reach an inner electrode. When hydrogen reaches the inner electrode, the inner electrode is swollen owing to diffusion of hydrogen, resulting in occurrence of cracks in the ceramic, IR degradation, and a decrease in insulation resistance in the reliability test, which is not desirable.

In the preferred embodiments, the case where the multilayer ceramic electronic component is a thin multilayer ceramic capacitor, which is embedded and mounted in a ceramic substrate for use, has been described as an example. However, the present invention is not limited to thin multilayer ceramic capacitors, but can be applied to common surface mount type multilayer ceramic capacitors.

Furthermore, the present invention is not limited to multilayer ceramic capacitors, but can be applied to other multilayer ceramic electronic components, such as multilayer inductors, multilayer LC composite components, and ceramic multilayer boards.

Furthermore, in other respects, the present invention is not limited to the preferred embodiments described above. Variations and modifications can be made to the preferred embodiments without departing from the scope and spirit of the invention, regarding the thickness and materials of the end-face outer electrode and the side-face outer electrode constituting the outer electrode, the thickness and the combination of materials of the layer in contact with the ceramic multilayer body and the outermost layer constituting the side-face electrode, the presence or absence of a plating film formed so as to cover the end-face outer electrode and the side-face outer electrode, and the material of a plating film when it is provided, and the like.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A multilayer ceramic electronic component comprising:
   a ceramic multilayer body having stacked ceramic layers and inner electrodes disposed between adjacent ceramic layers of the stacked ceramic layers; and
   first and second outer electrodes disposed on respective surfaces of the ceramic multilayer body, the first outer electrode being electrically connected to a first set of electrodes of the inner electrodes, and the second outer electrode being electrically connected to a second set of electrodes of the inner electrodes,
   wherein the first and second outer electrodes each include:
   an end-face outer electrode disposed on an end face of the ceramic multilayer body; and a side-face outer electrode on side faces of the ceramic multilayer body and electrically connected to the end-face outer electrode, and wherein the side-face outer electrode includes:
(a) a first sputtered electrode layer in contact with the ceramic multilayer body, the first sputtered electrode layer including a material containing 3% by mass or more of a metal having a standard oxidation-reduction potential of −2.36 to −0.74 V, and
(b) a second sputtered electrode layer which is an outermost layer constituting the side-face outer electrode and which includes at least one of Sn and Bi or an alloy containing 5% by mass or more of at least one of Sn and Bi,
the first sputtered electrode layer including a material that is different from a material of the end-face outer electrode, and
the side-face outer electrode only overlaps an edge of the end-face outer electrode.

2. The multilayer ceramic electronic component according to claim 1, wherein the metal contained in the first sputtered electrode layer is at least one selected from the group consisting of Mg, Al, Ti, W, and Cr.

3. The multilayer ceramic electronic component according to claim 1, further comprising a plating metal film on a surface of each of the first and second outer electrodes.

4. The multilayer ceramic electronic component according to claim 2, further comprising a plating metal film on a surface of each of the first and second outer electrodes.

5. The multilayer ceramic electronic component according to claim 1, wherein the end-face outer electrode contains Ni.

6. The multilayer ceramic electronic component according to claim 5, wherein the end-face outer electrode is a baked Ni electrode.

* * * * *